Jan. 26, 1971  W. J. KISSEL  3,557,565
THERMAL DEVICE CALIBRATING APPARATUS
Filed March 24, 1969  2 Sheets-Sheet 2

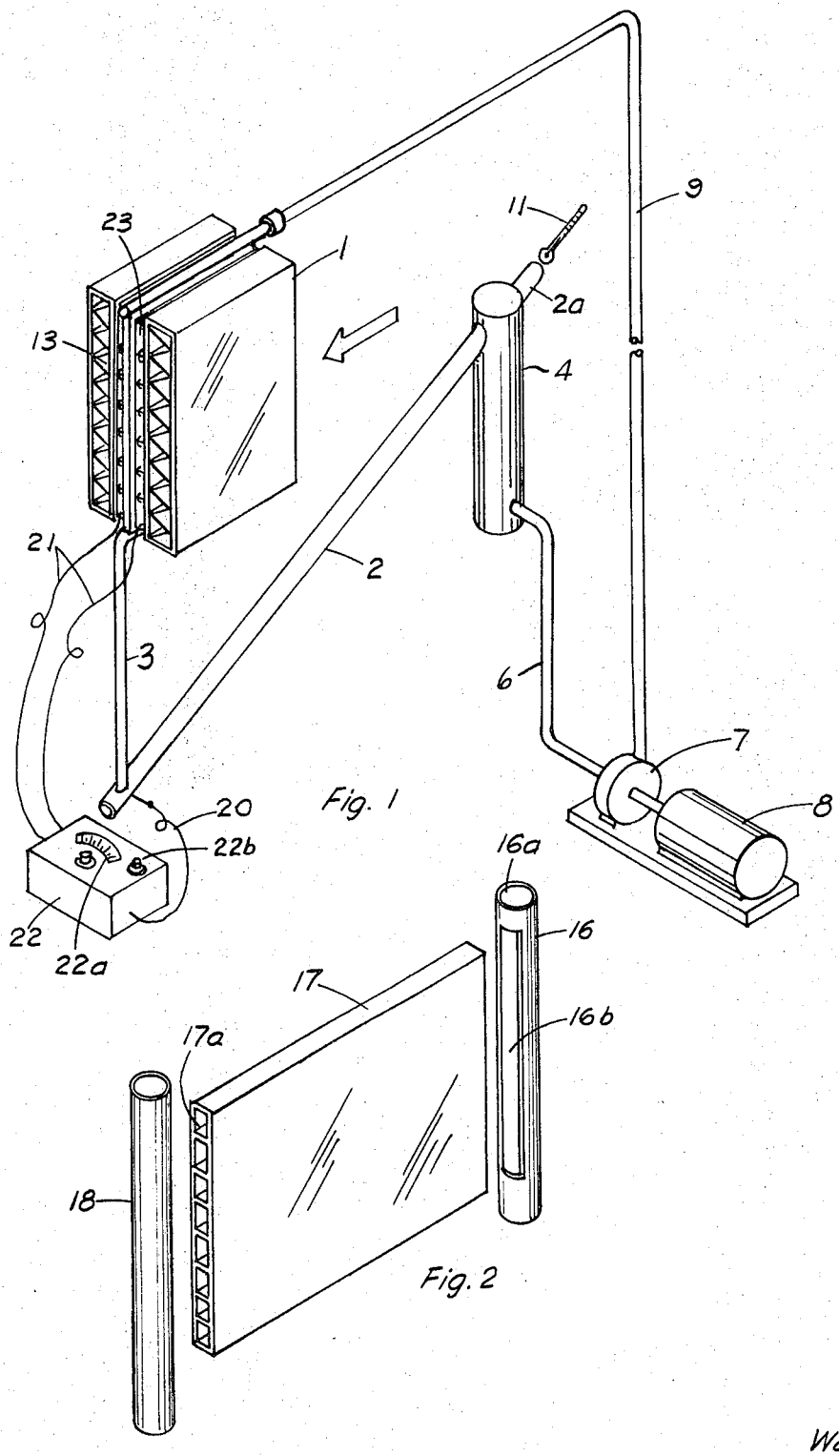

INVENTOR.
Walter J. Kissel
BY
Edward M. Steutermann
ATTORNEY

United States Patent Office 3,557,565
Patented Jan. 26, 1971

3,557,565
THERMAL DEVICE CALIBRATING APPARATUS
Walter J. Kissel, Olivette, Mo., assignor to American Air Filter Company, Inc., Louisville, Ky., a corporation of Delaware
Filed Mar. 24, 1969, Ser. No. 809,762
Int. Cl. F25b 21/02
U.S. Cl. 62—3　　　　　　　　　　　　　　1 Claim

ABSTRACT OF THE DISCLOSURE

An arrangement for calibrating temperature indicating devices at selected temperatures which includes a fluid flow circuit adapted to receive a temperature indicating device and the device is immersed in a fluid which flows through the circuit. The circuit includes heat exchange means to temper the fluid to a selected temperature where the heat is supplied to and removed from the heat exchanger means by a reversible electric thermal effect generating device.

BACKGROUND OF THE INVENTION

Previous means for calibrating temperature indicating devices, for example thermometers, have generally provided a large volume of fluid maintained at a selected temperature and thus have been very cumbersome. While the excessive volume of fluid provided by such arrangements assures a stable, uniform, temperature it is necessary to provide a separate device for every different temperature because of the time required to change the temperature of the entire volume of liquid so thermometer calibration at more than one temperature requires a significant amount of expensive equipment.

SUMMARY OF THE INVENTION

The present invention provides an extremely accurate apparatus where the temperature of the fluid, in which the thermometer is immersed, is accurately and rapidly adjusted so that the same device can be used to calibrate a thermometer or other thermal indicating device at several different temperatures.

Furthermore, in accordance with the present invention, a straightforward, inexpensive, arrangement is provided for calibrating a thermometer which requires very little fluid, and the fluid is circulated through a fluid flow circuit including a tube adapted to receive a thermometer disposed within a selected portion of the circuit. The temperature of the fluid is selectively controlled by transferring or removing heat to or from the flowing fluid by means of a reversible electric thermal effect generating module downstream of the tube where the operation of the module, with regard to addition or removal of heat, is controlled by the direction of current flow through the thermal module so that thermometers can be easily calibrated at temperatures above and below ambient temperature.

Various other features of the present invention will become obvious to those skilled in the art upon reading the disclosure set forth hereinafter.

More particularly, the present invention provides a calibrating arrangement for a temperature indicating device comprising: a fluid receiver having a fluid inlet and a fluid outlet to hold a selected quantity of fluid; fluid pump means communicating with the receiver outlet; a heat exchange means with a heat transfer section having fluid flow conduits, a fluid inlet manifold having a fluid inlet communicating with the outlet of the pump means and fluid outlet communicating with the conduits through said heat transfer section, and a fluid outlet manifold having inlet means communicating with the outlets of the conduits of the heat transfer section and a fluid flow outlet; calibrating tube means having a fluid inlet communicating with the outlet of the fluid outlet manifold and a fluid outlet end communicating with the inlet of the receiver where the tube is adapted to receive a selected temperature indicating device to be calibrated; a reversible electric heat generating and cooling device disposed in heat transfer relation with said heat transfer section of the heat exchange device; temperature sensing means disposed within the tube means to determine the temperature of fluid flowing through the tube means; and, electric power supply means connected with said reversible heat generating and cooling device whereby direction and magnitude of flow of electric current through said heat generating and cooling device is controlled in accordance with the temperature of said fluid in said tube means.

It is to be understood that the example of one arrangement in accordance with the present invention given hereinafter is not by way of limitation and that various changes can be made in the arrangement, form, or configuration of the apparatus disclosed without departing from the scope or spirit of the present invention.

Referring now to the figures which show one example of an apparatus in accordance with the present invention:

FIG. 1 is a schematic illustration of one arrangement in accordance with the present invention;

FIG. 2 is an exploded view of a heat exchange device which can be used in the apparatus of FIG. 1;

Figure 3:
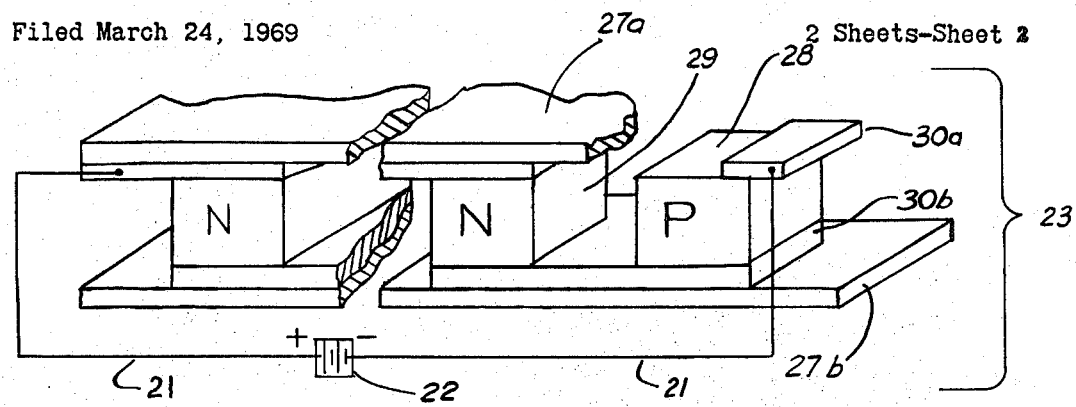
FIG. 3 is a schematic illustration, in section, of one thermal electric module arrangement which can be used in apparatus in accordance with the present invention; and, FIG. 4 is an exploded view showing an arrangement of a heat exchange device which can be used in the arrangement shown in FIG. 1.

In accordance with one example of the present invention, the arrangement shown in FIG. 1 includes a heat exchange device 1, as hereinafter described, to temper the fluid which flows through the circuit. The fluid flow circuit further includes an overflow tube 2 adapted to receive selected temperature indicating devices, for example thermometers, which communicate with an overflow fluid receiver 4 and with the outlet from the heat exchange assembly 1 by means of conduit 3. A tube extension 2a extends outwardly from receiver 4, as shown, in aligned communicative relation with tube 2 so that the temperature indicating device, for example a thermometer 11, can be inserted into the tube 2 by way of receiver 4.

Receiver 4 is connected to a pump 7 by means of conduit 6. Pump 7, provided to circulate fluid throughout the fluid flow circuit, is driven by a motor 8 and is connected to a fluid inlet manifold 16 of heat exchange assembly 1 by means of a conduit 9.

Heat exchange assembly 1 includes a multi-passage heat transfer section 17 having a mutiplicity of fluid flow conduits 17a communicating with the fluid outlet 16b of inlet manifold 16 as shown in FIG. 2. An outlet manifold 18 is provided to receive fluid emitted from passages 17a of heat transfer sections 17. Thus, fluid flows through inlet manifold 16, through passages 17a of heat exchange core 17 and is received by fluid outlet manifold 18.

Outlet manifold 18 is connected to the inlet of tube 2 by means of conduit 3. In the arrangement shown, it will be noted that tube 2 is disposed at an acute angle relative to the horizontal so the tube is always full of fluid with fluid overflowing from tube 2 to receiver 4 and the portion of the thermometer received in tube 2 is immersed in the selected fluid along the length of the tube.

Various fluids, for example a liquid solution such as ethylene glycol-water, can be circulated through the fluid flow circuit.

Figure 4:
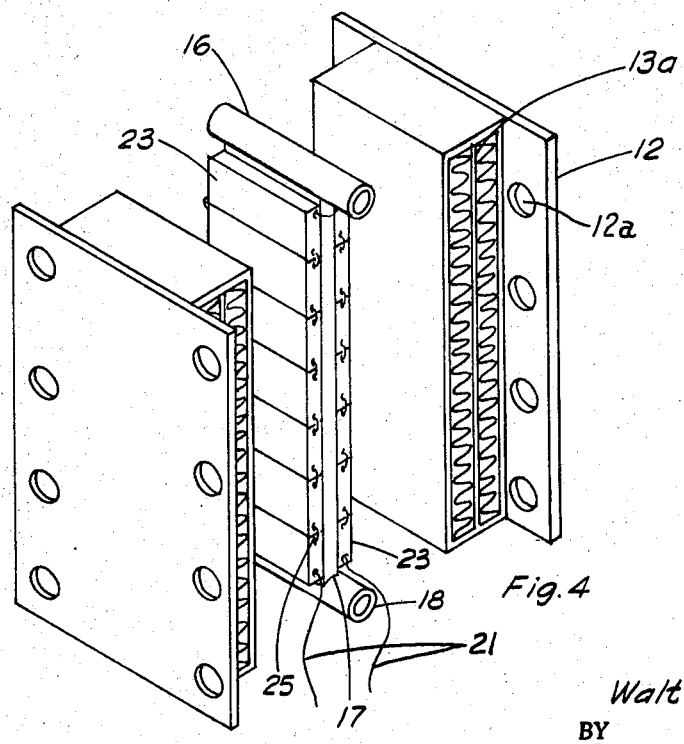

Referring to FIG. 4 which shows an exploded view of a heat exchange assembly, thermal electric cell members 23, as schematically illustrated in FIG. 3 and hereinafter described, can be connected in series and attached in heat transfer relation to the surfaces of heat transfer section 17 so heat can be selectively transferred to or from the fluid flowing through passages 17a. Extended surface area heat exchangers 13a are fastened to the surfaces of thermal electric modules 23 to provide or remove heat, as the case may be, from the surfaces of the thermal electric modules opposite heat transfer core 17 to prevent undesirable thermal effects and to improve efficiency of the modules.

In the example shown in FIG. 4, cover plates 12 are attached to extended surface heat exchangers 13 and apertures 12a are provided to receive bolts (not shown) to facilitate assembly of the elements shown into a compact heat exchange device 1 for use in the fluid flow circuit as shown in FIG. 1.

FIG. 3 is a schematic illustration of construction and operation of one example of a thermal electric module 23 for use in apparatus in accordance with the present invention. The arrangement makes use of the well-known Joule and Peltier effects that when electric current traverses the junction of one electrical connector strip 30 and selected semiconductors, for example alloys of bismuth, germanium, or tellurium, heat is absorbed or given off depending on characteristics of the semiconductor and the connector strip and on the direction of current flow, while the quantity of heat is a function of the intensity of the current, and the characteristics of the conductor strips and the semiconductor.

In the example of a thermal electric module 23 as shown in detail in FIG. 3 two types of semiconductors shown as N semiconductors 29 and P semiconductors 28 are used and are connected in series by conductor strips 30. By proper selection of semiconductors and connectors and by connecting the semiconductors in series as shown, current flow is from one semiconductor to the connector strip to the second semiconductor and since the characteristics of the semiconductors are opposite, the same thermal effect, i.e., cooling, occurs at both semiconductor-connector strip junctions.

As shown in FIGS. 1 and 3, a source of power 22 is connected by leads 21 to assembly 23 so current flows through the semiconductor series circuit and it will be noted that opposite effects occur on opposite sides of the assembly, i.e., a heating effect on one side of module 23 and a cooling effect on the opposite side.

Thermal conductive panels 27a, 27b are connected to conductor strips 30a, 30b opposite sides of the assembled semiconductor circuit to conduct heat to and from the conductor strips 30a and 30b as the thermal effect is generated by the current flowing through the circuit.

In the example of FIG. 3, positive and negative terminals are indicated for electrical source 22 and in current flowing through the arrangement shown, heat is generated at the junctions between conductor strips 30a and the semiconductors while heat is absorbed by the junctions between conductor 30b and the semiconductors. The heat supplied to conductor strips 30a flows through panels 27a while the heat supplied to semiconductors 28, 29 and conductor strips 30b flow inwardly through panel 27b.

In FIG. 4 the modules are assembled so that the corresponding side of each, for example surface 27b, is in adjacent heat transfer relation with heat transfer assembly 17, and surface 27a of each module is in contact with heat exchangers 13a. The fluid flowing through heat transfer assembly 17 is, for example, cooled and the heat generated on the opposite side of the module is transmitted to extended surface heat exchangers 13.

By reversing the direction of flow of current through the semiconductors series circuit the direction of heat transfer is reversed so that heat is transferred through panel 27b to heat exchange assembly 17 to heat the fluid flowing through the assembly and heat is transferred from extended surface heat exchangers 13 to panel 27a to maintain the temperature of the surface.

Operation of the thermal electric module assembly is controlled by power supply 22 connected to the thermal electric modules 23 by means of lead wires 21. A temperature sensitive device is provided in tube 2 and is connected to power supply 22 by means of a lead 20. Power supply 22 is operated in response to the temperature of the fluid in tube 2 to control the direction and intensity of current flow through thermal electric module 23. Power supply 22 can include a two-digit thumbwheel switch 22a whereby a desired fluid temperature is selected and an indicator light 22b can be provided to indicate when the desired temperature has been attained.

In operation, pump 7 is operated to circulate fluid through the circuit, the device to be calibrated is inserted in tube 2 and scale 22a is set at the desired fluid temperature. Power supply 22 controls current flow through modules 23 in accordance with the difference between the desired fluid temperature and the actual fluid temperature until the temperature of the fluid in the circuit reaches the desired temperature when the indicator light 22b is actuated and current flow can cease or can be modified to maintain the desired fluid temperature.

The invention claimed is:

1. A temperature calibrating arrangement comprising: a fluid receiver having a fluid inlet and a fluid outlet to hold a selected quantity of fluid; fluid pump means communicating with said receiver outlet; heat exchange means having a fluid flow conduit means; a fluid inlet communicating with the outlet of said pump means and a fluid outlet communicating with the fluid flow conduits; calibrating tube means having a fluid inlet communicating with said fluid outlet of said heat exchange means and a fluid outlet end communicating with said receiver fluid inlet where said tube means is adapted to receive a selected temperature indicating device; a reversible heat generating and cooling device operated by electric current flow disposed in heat transfer relation with said heat transfer section of said heat exchange device; temperature sensing means disposed within said tube means to determine temperature of fluid flowing through said tube means; and, temperature sensitive electrical power supply means connected with said reversible heat generating and cooling device and with said temperature sensing means whereby direction of flow and magnitude of electric current through said heat generating and cooling device is controlled in accordance with the temperature of fluid in said tube means to determine the thermal effect provided by said heat generating and cooling device to modulate the temperature of said fluid.

References Cited

UNITED STATES PATENTS

| | | | |
|---|---|---|---|
| 3,234,595 | 2/1966 | Weichselbaum | 62—3 |
| 3,366,164 | 1/1968 | Newton | 62—3 |
| 3,399,536 | 9/1968 | Walz | 62—3 |
| 3,480,015 | 11/1969 | Gonzalez | 62—3 |

WILLIAM J. WYE, Primary Examiner